United States Patent [19]

Chen et al.

[11] Patent Number: 4,806,589
[45] Date of Patent: Feb. 21, 1989

[54] POLY(ALKYLENE TEREPHTHALATE) COMPOSITIONS HAVING IMPROVED CRYSTALLIZATION RATE AND PROPERTIES

[75] Inventors: Augustin T. Chen, Cheshire; Kemal Onder, North Haven, both of Conn.

[73] Assignee: The Dow Chemical Company, Midland, Mich.

[21] Appl. No.: 83,350

[22] Filed: Aug. 10, 1987

[51] Int. Cl.$^4$ ...................... C08L 67/02; C08L 77/00
[52] U.S. Cl. ...................... 524/539; 525/440
[58] Field of Search ............... 525/425, 440; 524/538, 524/539

[56] References Cited

U.S. PATENT DOCUMENTS

| | | | |
|---|---|---|---|
| 4,362,836 | 12/1982 | Hoeschele | 524/322 |
| 4,368,286 | 1/1983 | Hayashi et al. | 524/394 |
| 4,368,288 | 1/1983 | Nield | 524/339 |
| 4,391,938 | 7/1983 | Memon et al. | 524/270 |
| 4,393,178 | 7/1983 | Legras et al. | 525/437 |
| 4,397,979 | 8/1983 | Reimschusell | 524/413 |
| 4,401,928 | 8/1983 | Axelrod | 525/175 |
| 4,404,161 | 9/1983 | Bier | 264/328.16 |
| 4,417,021 | 11/1983 | Nakamura | 524/538 |
| 4,425,470 | 1/1984 | Garcia | 525/444 |
| 4,547,547 | 10/1985 | Chen | 525/425 |

OTHER PUBLICATIONS

D. Garcia, Heterogeneous Nucleation of Polyethylene Terephthalate, Polymer Preprints, American Chemical Soc. 25(1) 197 (1984).

Primary Examiner—Patricia Short
Attorney, Agent, or Firm—James S. Rose

[57] ABSTRACT

Disclosed are homogeneous blends comprising (a) a poly(alkylene terephthalate) and (b) a sufficient amount of a crystalline polyamide to impart enhanced crystallization velocity to said polyalkylene terephthalate. The crystalline polyamide comprises a narrow class of aromatic-aliphatic polyamides prepared from 4,4'-methylenebis(phenyl isocyanate) and a small group of aliphatic dicarboxylic acids.

the poly(alkylene terephthalates) are characterized by enhanced crystallization rates which lead to a number of improved properties over the base polyester.

11 Claims, No Drawings

POLY(ALKYLENE TEREPHTHALATE) COMPOSITIONS HAVING IMPROVED CRYSTALLIZATION RATE AND PROPERTIES

FIELD OF THE INVENTION

This invention relates to poly(alkylene terephthalate) compositions and is more particularly concerned with poly(alkylene terephthalate) blends having enhanced rates of crystallization.

DESCRIPTION OF THE PRIOR ART

Terephthalate based polyesters have become quite important engineering thermoplastic materials. The two most common are poly(ethylene terephthalate) (PET) and poly(butylene terephthalate) (PBT), and, to a lesser extent, poly(cyclohexylenedimethylene terephthalate) (PCT). PET has a higher metling point and higher modulus and is economically more attractive than PBT. However, these types of polyesters suffer from slow crystallization rates making it necessary to use long molding cycles and high mold temperatures when fabricating molded parts. PET along with PCT are particularly deficient in this respect which tends to negate their economic advantages, particularly in regard to PET.

A number of techniques have been applied in the quest to improve the rate of crystallization of poly(alkylene terephthalates) by way of nucleating the amorphous polymer. For the most part, the techniques have involved the seeding or nucleation of the amorphous materials in much the same manner as supersaturated organic solutions are seeded to cause a solute to crystallize out; see "*Heterogeneous Nucleation of Polyethylene Terephthalate*" by D. Garcia, Polymer Preprints, American Chemical Soc., 25(1), 197 (1984). Representative of such techniques is the use of alkali or alkaline earth metal salts of organic acids as disclosed in U.S. Pat. Nos. 4,362,836, 4,368,286, 4,368,288, 4,391,938, 4,393,178, and 4,425,470. Other inorganic nucleating agents are disclosed in U.S. Pat. No. 4,397,979 such as certain lithium, manganese, and zirconium salts. These are employed in a wide range of polymers inclusive of polyamides and polyesters. Reference is also made in the latter patent to the prior art use of substances such as calcium fluoride, molybdenum disulfide, lead tungstate, antimony trioxide, graphite, talcum and asbestos as effective nucleating agents for poly(hexamethylene adipamide) (Nylon 66) and PET. U.S. Pat. No. 4,401,792 specifically calls for the blending in of ionomers or alkali melt salts of benzoic acid with poly(alkylene terephthalates) to provide for increased crystallization rates of the base polymers.

Rapidly crystallizing blends of PET with a small amount of a two phase polyacrylate comprised of a cross-linked elastomeric first phase to which a rigid thermoplastic second phase has been grafted are disclosed in U.S. Pat. No. 4,404,161. There is some question as to whether true homogeneous blends are actually obtained in this process.

Nakamura (U.S. Pat. No. 4,417,021) has disclosed PET compositions having faster crystallization rates than the base PET. A specific class of polyamides are used as nucleating agents in these compositions. The polyamides are high melting relatively infusible polymers and are employed, and, end up in the final compositions, as finely divided particles. In fact, to obtain the necessary uniform dispersions of Nakamura requires troublesome preparative steps. These include pulverizing and grinding operations, grafting the polyamide to other polymers to aid in dispersing it with the PET or the use of complicated co-precipitation techniques with the PET as well as the use of dispersing aids. The vast number of nucleating agents of Nakamura embrace polyamides and polyhydrazides in all configurations of homopolymers, random copolymers, block copolymers and block or graft copolymers with other polymers, all preferably having melting points in excess of 300° C. All of the polyamides disclosed are prepared from the polymerization of diamines with acid chlorides (namely carbonyl chlorides). Included in Nakamura's generic formula (IV) are those wherein the radical $R_1$ includes a divalent alkyl having up to 8 carbon atoms which is illustratively supported at column 4, line 64 by poly(4,4'-methylenediphenylene sebacamide). Regardless of the structures disclosed, Nakamura's polyamides are insoluble in the base PET being uniformly dispersed. Elucidation of this aspect of the Nakamura compositions is disclosed at column 18, lines 5 to 30.

There still remains a need for providing rapidly crystallizing poly(alkylene terephthalate) compositions in a facile, economic, and simplified manner.

SUMMARY OF THE INVENTION

This invention comprises homogeneous polymer blends comprising (a) a poly(alkylene terephthalate) and (b) a sufficient amount of a crystalline polyamide to impart enhanced crystallization velocity to said poly(alkylene terephthalate) said (b) being a linear polyamide selected from the group consisting of poly(4,4'-methylenediphenylene azelamide), poly(4,4'-methylenediphenylene sebacamide), poly(4,4'-methylenediphenylene undecanediamide), poly(4,4'-methylenediphenylene dodecanediamide), and mixtures thereof and being further characterized in that it has been prepared by the reaction of 4,4'-methylenebis(phenyl isocyanate) and the corresponding dicarboxylic acid.

The term "alkylene" in respect of poly(alkylene terephthalate) means an alkylene radical having 2 to 6 continuous carbon atoms such as ethylene, propylene, butylene, pentylene, hexylene, and isomeric forms thereof; or wherein said carbon atoms are interrupted by at least one member selected from the class consisting of —O—, $C_5$ to $C_6$ cycloalkylene, $C_6$ to $C_{12}$ arylene and the like. Illustrative of such radicals within the term alkylene are oxydiethylene, 1,3-cyclopentylenedimethylene, 1,4-cyclohexylenedimethylene, 1,4-xylylene, 1,4-phenylenediethyleneoxy, 4,4'-bisphenol A diethyleneoxy, and the like.

The term "sufficient amount" in respect of imparting enhanced crystallization velocity to the poly(alkylene terephthalate) means sufficient amount to cause a measurable reduction in the $\Delta T$ value of the blend.

The term "$\Delta T$" as used herein means the difference in degrees centigrade observed between the temperature of melting ($T_m$ °C.) of the blend as measured by differential scanning calorimetry (DSC) when the blend is heated and the temperature of recrystallization ($T_{recryst}$ °C.) after the blend has been melted and it is slowly cooled (at about 10° C. per minute) and the poly(alkylene terephthalate) crystallizes from the melt; see U.S. Pat. No. 4,397,979 cited supra for a detailed explanation of this test and whose disclosure relative thereto is incorporated herein by reference. The smaller the value of ΔT, the faster the crystallization rate and, therefore, the greater the enhancement of crystallization.

Accordingly, it has been discovered that a very narrow class of crystalline polyamides can be simply melt-blended with poly(alkylene terephthalates) to provide homogeneous blends which have greatly enhanced crystallization rates. Such compositions satisfy fully the needs set forth above which no prior art composition heretofore could meet.

Additionally, the blends of the invention have enhanced resistance to elevated temperature as measured by heat deflection temperature (HDT) values discussed below.

DETAILED DESCRIPTION OF THE INVENTION

The polyalkylene terephthalate component of the blends can be any of those terephthalates which are available commercially or which can be prepared by known techniques such as by alcoholysis of terephthalic acid esters with diprimary alcohols such as ethylene glycol, propylene glycol, butylene glycol, diethylene glycol, 1,4-cyclohexanedimethanol, 1,4-bis(hydroxymethyl)benzene, and the like, and subsequent polymerization by heating the glycols with the free acids or with the halide derivatives thereof, or by similar processes such as those described in U.S. Pat. Nos. 2,465,319 and 3,047,539. A preferred group of polyesters is comprised of polyethylene terephthalate (PET), polypropylene terephthalate (PPT), polybutylene terephthalate (PBT), polycyclohexylenedimethylene terephthalate (PCT), and blends of two or more thereof. While both polypropylene terephthalate and polybutylene terephthalate crystallized faster than PET, they both can benefit by the addition of the component (b) discussed below. PET and PCT are the most preferred for component (a) because of their superior heat resistance and they receive the maximum benefit in crystallization enhancement.

The polyesters generally have an intrinsic viscosity of at least about 0.4 dl./per gram and preferably at least about 0.6 dl./per gram as measured in 60:40 phenol/tetrachloroethane mixture at 30° C. in a concentration of 0.5 percent by weight.

The crystalline polyamides (b) employed in the compositions of the invention are the four materials defined above. They are specifically prepared from 4,4'-methylenebis(phenyl isocyanate) and the appropriate dicarboxylic acid in essentially stoichiometric proportions. While it is preferred to use essentially pure 4,4'-isomer, minor amounts (up to about 20 percent) of 2,4'-methylenebis(phenyl isocyanate) may be present with the 4,4'-isomer. The acids are adipic, sebacic, undecanedioic, and dodecanedioic. For typical preparative methods using the diisocyanate and dicarboxylic acids see U.S. Pat. Nos. 3,462,715, 4,061,622, and 4,094,866 whose disclosures relative thereto are incorporated herein by reference.

Preferred species of polyamides in accordance with the present invention are poly(4,4'-methylenediphenylene azelamide) and poly(4,4'-methylenediphenylene dodecanediamide).

Minor amounts (from about 2 to about 10 mole percent) of other recurring polymer linkages such as other polyamide, polyether, and polyester, can be present in the polyamides. However, the preferred polyamides do not contain copolymer linkages of any type. Physical mixtures of the above described polyamides can be used in accordance with the present invention.

The polyamides employed in the blends of the invention are further characterized by a molecular weight which, advantageously, is defined by an inherent viscosity range of about 0.5 to about 1.5 and, preferably, from about 0.7 to about 1.1 as determined under standard test conditions: e.g., at 0.5 percent by weight in N-methylpyrrolidone containing a small amount of lithium chloride and determined at about 30° C.

The molecular weights of the polyamides are easily controlled during their preparation using any of the well known techniques such as time and temperature of polymerization, chain terminators, control of the index of reactants, and the like.

As set forth above the proportions in which the (b) component is employed is sufficient to impart enhanced crystallization velocity to the polyester component as defined above. Generally speaking, the proportions will fall within a range of from about 5 to about 50 percent by weight, preferably from about 15 to about 50 percent based on the combined weight of (a) and (b).

The blends can be prepared in any convenient manner provided the (a) and (b) are eventually fluxed or homogenized to provide the homogeneous blend. For example, they can be brought together in solid form and dry-blended using conventional means such as a barrel mixer, tumble mixer, rubber mill, and the like. The dry blend can then be fluxed using a single or twin-screw compounder or extruder. Alternatively, the components can be brought together directly in a melt compounder and extruded in the form of strands and the like which are then pelletized for injection molding purposes. Standard techniques, apparatus, and conditions well known in the art can be used for these purposes.

Additionally, the compositions in accordance with the present invention can be further blended with up to about 60 percent by weight based on total blend weight of reinforcing agents, fillers, and mixtures thereof. Advantageously, these additional additives can comprise about 5 to about 60 percent by weight, and, preferably about 10 to about 50 percent by weight of the blend. Illustrative of reinforcing agents are inorganic and organic fibers (including strands, chopped, roving, mats, and the like) such as glass fibers, carbon fibers, poly(phenyleneisophthalamide) fibers, poly(benzamide) fibers, and the like. Preferred reinforcing agents are glass fibers.

Illustrative of fillers which can be used are talc itself, calcium carbonate, kaolin, graphite, molybdenum disulfide (the latter two for lubricity), powdered metals such as aluminum, copper, and the like.

The preferred filler is talc. In fact, in a surprising and unexpected finding, talc can be used both as a crystallization promoter and a filler in accordance with the amounts specified above for fillers. The polymers obtained from such blends have the properties of rapid crystallization, retention of the good polyester physical properties and are more economically attractive by virtue of the fact that the more expensive ingredients are being replaced by the talc.

Other additives may be added to the compositions in accordance with the present invention. Illustratively, such additives include antioxidants, dyes, whitening agents (titanium dioxide), fire retardants, lubricants, and the like.

The homogeneous polymer blends in accordance with the present invention are characterized by their markedly enhanced rate of crystallization. For purposes of the invention the enhancement has been defined in terms of the reduction in the ΔT values discussed above. Generally speaking, the blends are characterized by a ΔT reduction of at least about 5 percent, preferably from about 5 to about 25, and, most preferably about 10 to about 25 percent reduction. That is to say, the recrystallization temperature from the melt of the poly(alkylene terephthalate) composition is raised towards its melting temperature by the percentage ranges above.

Other ways of assaying this enhanced crystallization rate can be employed as in the measurement of the half-time measured in seconds for the crystallization of the polyester measured at an isothermal test temperature from a shock-cooled melt. Such a procedure is disclosed in U.S. Pat. No. 4,536,533 and employed in the working examples below.

In an added but unexpected benefit to flow from the present compositions, they enjoy the good properties of amorphous materials such as ease of injection moldability while at the same time having enhanced resistance to high temperature environments. Accordingly, the blends have been found to have much superior HDT properties over the base polyester when measured at loadings of 66 psi and 264 psi when tested in accordance with ASTM Test Method D-648. In terms of practical utility, this means that molded articles from the blends can be used at higher temperatures and under higher loadings than the base polyester.

In yet another unexpected advantage of the present blends, it has been discovered that the combination of higher HDT under higher load conditions with reinforcing agents results in creep resistance superior to the base polyester.

Furthermore, it is observed that the melt blending of the crystalline polyamides (b) with the polyester (a) is without effect on the molecular weight of the latter. Contrastingly, it is known in the art that a large number of the nucleating agents employed resulted in, and, in fact operate on the principle of, lowering the polyester molecular weight by degrading some of the polymer molecules.

The homogeneous blends of the invention can be directly injection molded, melt spun, cast, and extruded to produce electronic cabinet housings, household goods, sports equipment, components for the electrical and electronics industry, electrical insulators, molded wiring boards, burn-in sockets, connectors, under the hood components, coatings inclusive of powder coatings for wood, glass, ceramics, metals, or other plastics, and the like, in the construction industry as building panels or facing panels for large buildings, and the like.

The following preparations and examples describe the manner and process of making and using the invention and set forth the best mode contemplated by the inventors for carrying out the invention but are not to be construed as limiting.

PREPARATION 1

Poly(4,4'-methylenediphenylene azelamide)

A 2 liter resin kettle is charged with 200.05 g (2.097 equivalents) of pure azelaic acid, 4.78 g (0.0168 equivalent) of stearic acid, and 900 ml. of dry tetramethylenesulfone. The stirred solution is heated to 230° C. and to this solution is added 1.32 g of dimethyl phospholine oxide followed by the slow addition (2.5 hours) of a solution of 262.35 g (98.5 percent of a precalculated 2.114 equivalents) of 4,4'-methylenebis(phenyl isocyanate) dissolved in 250 ml. of dry tetramethylenesulfone. The remaining 1.86 g of 4,4'-methylenebis(phenyl isocyanate) dissolved in 10 ml. of tetramethylenesulfone is added in five separate portions to the stirred reaction mixture at 230° C. to bring the total added isocyanate concentration level to about 1 percent over stoichiometric index. The reaction solution is heated at 230° C. and stirred for an hour.

The reaction solution is poured into water thereby causing the precipitation of the polymer in the form of solid strands. The solid polymer is chopped up in a Waring blender, collected on a suction filter and washed in a continuous slow stream of water for 8 hours and finally dried at 110° C. The inherent viscosity of the poly(4,4'-methylenediphenylene azelamide) determined at 0.5 percent by weight in N-methylpyrrolidone containing 4 percent by weight lithium chloride at 30° C. is 1.23 for virgin polymer.

The polymer is extruded in the form of a ⅛ inch rod using a Brabender Plasti-Corder at a screw speed of 40 r.p.m. and torque less than 1000 m-g (meter-grams) with all four zone temperatures set at 280° C.; the rod is then chopped into pellets. The inherent viscosity on the extruded polymer determined same as above is 1.1.

PREPARATION 2

Poly(4,4'-methylenediphenylene dodecanediamide)

A 2 liter resin kettle is charged with 220.24 g (1.915 equivalents) of pure 1,12-dodecanedioic acid, 4.36 g (0.0153 equivalent) of stearic acid, and 1000 ml. of dry tetramethylenesulfone. The stirred solution is heated to 247° C. and to this solution is added 1.22 g of dimethyl phospholine oxide followed by the slow addition (3 hours) of 243.24 g (1.930 equivalents) of 4,4'-methylenebis(phenyl isocyanate) dissolved in 250 ml. of tetramethylenesulfone. Following the addition the reaction solution is heated at 247° C. for 24 hours. During this 24 hour period samples are removed to check viscosity at intervals of 15 and 30 minutes. 1, 2, 3, 19, 21, 23, and 24 hours. The inherent viscosity of the reaction solution determined at 30° C. ranges from a low of 0.94 at the 15 minute mark to a maximum of 1.16 at 2 hours and finally 1.10 at 24 hours.

The polymer is isolated using the same procedure set forth in Preparation 1. The inherent viscosity of the virgin polymer determined at 0.5 percent by weight in N-methylpyrrolidone containing 4 percent by weight lithium chloride at 30° C. is 1.12.

The polymer is extruded and chopped into pellets using the same apparatus and procedure described in Preparation 1 except that the torque is 700 m-g and zone 1 is 270° C. with the other three zones being 280° C. The inherent viscosity on the extruded polymer determined as above described is 1.08.

EXAMPLE 1

Five homogeneous polymer blends (A through E) in accordance with the present invention are prepared first as dry powder blends by thoroughly mixing the following ingredients in an electrically driven rotating tumbler.

In A, B, D, and E, 30 g, 60 g, 180 g, and 350 g portions of the powdered poly(4,4'-methylenediphenyl azelamide) obtained in accordance with Preparation 1 above are respectively mixed with 570 g, 540 g, 420 g, and 350 g portions of powdered polyethylene terephthalate having an inherent viscosity of about 0.9 determined as 0.5 weight percent solution in 75/25 trifluoroacetic acid/chloroform (Cleartuf ™ 7207 bottle grade PET supplied by Goodyear Chemical). Blends D and E additionally contain 6 and 7 g, respectively, of talc (MP 10-52 supplied by Pfizer Inc.). Blend C is prepared from 210 g of the same polyamide with 490 g of PET of slightly higher molecular weight with inherent viscosity of about 1.0 to 1.1 determined identically to above (Cleartuf ™ 1006 supplied by Goodyear). All five blends are extruded through a Brabender Pasti-Corder in the form of ⅛ inch rod at a screw speed of 40 r.p.m., torque of 750 to 1000 m-g, zone temperatures of 1=270° C.; 2=270° C.; 3=275° C.; and 4=275° C.; melt temperature is 291° C. The rods of homogeneous polymer blends are chopped into pellets.

The crystallization characteristics of the blends and base PET are determined using a Du Pont Model 990 Thermal Analyzer equipped with a differential scanning calorimeter (DSC) cell. Three sets of tests are carried out in order to determine: 1. melting behaviour ($T_m$); 2. temperature of recrystallization ($T_{recryst}$); and 3. half-time ($T_{\frac{1}{2}}$) to crystallization at isothermal temperature.

The first test of melting behaviour is carried out simply by heating the sample in an aluminum boat in the DSC cell at a rate of about 20° C./minute under nitrogen and noting the crystallization (exothermic) events and melting (endothermic) events with temperature. The results observed for PET (Cleartuf ™ 7207) and blends A, B, C, and E are set forth in Table I.

TABLE I

| Sample | % Polyamide | $T_g$ (°C.) | $T_{cry}$ (°C.) | $T_m^1$ (°C.) | $T_m^2$ (°C.) |
|---|---|---|---|---|---|
| PET | 0 | 86 | 160 | 257 | — |
| Blend A | 5 | — | 145 | 259 | — |
| Blend B | 10 | — | 147 | 260 | 285 |
| Blend C | 30 | — | — | 267 | 287 |
| Blend E | 50 | — | — | 263 | 287 |

Footnotes:
[1] Melting of PET fraction.
[2] Melting of Polyamide fraction.

Heating of the PET sample results in first the exothermic second transition temperature ($T_g$) at 86° C. The crystallization of the amorphous PET occurs with the exothermic event at 160° C. and finally the endothermic melt at 257° C. This melting behaviour is changed in blends A and B with a less visible $T_g$ so as to be really non-determinable, smaller crystallization exotherms at the lower temperatures of 145° and 147° C., respectively, and very small to non-determinable melting of polyamide (phase mixing with PET). At the higher polyamide contents of 30 and 50 percent, the $T_g$ shoulders and crystallization exotherms are gone. This provides strong evidence of the increased crystallization rate for the PET because blends C and E show only the melting events for the PET and polyamide components.

The second test for determining the temperature of recrystallization is a standard test wherein the samples are heated at 10° C./minute to 300° C., held at that temperature for 2 minutes to ensure the molten state then cooled at the rate of 10° C./minute and the recrystallization temperature is noted (exothermic event). Following in Table II are the results for the same series of samples set forth in Table I.

TABLE II

| Sample | $T_g$ (°C.) | $T_m$ (°C.) | $T_{recryst}$ (°C.) | $\Delta T$ (°C.) |
|---|---|---|---|---|
| PET | 86 | 257 | 186 | 71 |
| Blend A | 84 | 259 | 192 | 67 |
| Blend B | 84 | 260 | 203 | 57 |
| Blend C | 85 | 267 | 212 | 55 |
| Blend E | 84 | 263 | 209 | 54 |

The $\Delta T$ values represent the difference between the $T_m$ and $T_{recryst}$ and the smaller the $\Delta T$ the faster the crystallization rate. Accordingly, as the polyamide content increases $\Delta T$ decreases. It will be noted that in blends C and E that a separate crystallization exotherm at 237° C. is observed which is the recrystallization exotherm for the polyamide constituents. It can be theorized that it is the crystallization of polyamide in the melt which form crystallites first which serve as internal nucleating agents.

The third test is the actual measurement in time for isothermal crystallization of the sample. The test is performed on four separate samples of each one of the same samples shown in Tables I and II except blend A. Each sample is quickly heated to 300° C., held 2 minutes, very quickly cooled to the test (isothermal) temperatures set forth in Table III and held at these temperatures while time is recorded for the peak of the exothermic event (crystallization) to occur. The shorter the half-time at a given temperature, or the higher the temperature at a given half-time, the faster the crystallization rate. The half-time in seconds observed are set forth in Table III for the respective isothermal temperatures tested. The much shorter $T_{\frac{1}{2}}$ values for blends B, C, and E even at higher isothermal test temperatures compared to the PET shows clearly the enhanced crystallization rates for these blends.

TABLE III

| Isothermal Test Temp. (°C.) | $T_{\frac{1}{2}}$ of crystallization (secs.) Composition | | | |
|---|---|---|---|---|
| | PET | Blend B | Blend C | Blend E |
| 185 | 104 | — | — | — |
| 190 | 152 | — | — | — |
| 195 | 208 | — | — | — |
| 200 | 318 | — | — | — |
| 205 | — | 68 | 39 | 18.5 |
| 210 | — | 114 | 63 | 52 |
| 215 | — | 155 | 116 | 99 |
| 220 | — | 238 | 218 | 207 |

Samples of the blends A, B, C, and E, as well as PET (Cleartuf ™ 7207) and the base polyamide of Preparation 1 are injection molded into dumbbell test bars (ASTM D638) and flex bars (ASTM D790) using an Auberg two oz. injection molding machine. The molding conditions are as follows: zone temperatures of 1=267° C.; 2=275° C.; and 3=275° C.; screw speed 85 r.p.m., injection pressure 600 psi, mold temperature 140° C., injection time 10 seconds, and injection hold (cooling time) 30 seconds. The physical properties are determined on all the samples in the as-molded state except as noted in Table IV.

TABLE IV

| | Compositions | | | | | |
|---|---|---|---|---|---|---|
| | PET[1] | Prep 1 | A | B | C | E |
| Tensile str. (psi) | | | | | | |
| Yield | 8125 | — | 8,000 | 8,560 | — | — |
| Break | 9200 | 9890 | * | * | 6,295 | 8,050 |

TABLE IV-continued

| | Compositions | | | | | |
|---|---|---|---|---|---|---|
| | PET[1] | Prep 1 | A | B | C | E |
| Elongation (%) | | | | | | |
| Yield | 3.9 | — | 4.1 | 3.4 | — | — |
| Break | 420.0 | 3.9 | * | * | 3.3 | 3.0 |
| Tensile Modulus (kpsi) | 298.0 | 284.8 | 265.5 | 251.9 | 306.2 | 324.6 |
| Flex Modulus (kpsi) | 306.0 | 370.0 | 353.7 | 374.1 | 419.3 | 430.4 |
| Flex str. (psi) | 12,070 | 16,390 | 12,670 | 13,100 | 12,370 | 11,310 |
| Notched Impact[2] (ft. lb./in.-notch) | 1.12 | 0.77 | 0.60 | 0.44 | 0.15 | 0.30 |
| HDT (°C.)[3] | | | | | | |
| 66 psi | 68 (144) | 121 | 74 | 74 | 125 | 149 |
| 264 psi | 65 (88) | 109 | 73 | 69 | 84 | 95 |

Footnotes:
*These samples have very large elongations.
[1]A sample of the molded PET was annealed at 95° C./2 hours and the HDT determined on the annealed as well as unannealed samples; the annealed results are shown in parenthesis after the values for the unannealed.
[2]Notched Impact: Izod impact determined in accordance with ASTM Test Method D256-56.
[3]HDT: The heat deflection temperature determined in accordance with ASTM Test Method D-648-56 measured at the test pressures of 66 and 264 psi.

The properties set forth in Table IV show the relatively low HDT properties of PET in the unannealed state. Even though PET has a higher $T_g$ and higher $T_m$ than polybutylene terephthalate (PBT) it has lower HDT values unannealed. PBT is observed as having HDT values of 142° C. and 50° C. at 66 and 264 psi respectively. These lower HDT values for PET are undoubtedly due to the lower crystallinity index of PET. Significantly, the blends A, B, C, and E show the very significant improvement in HDT over the pure PET, particularly at high load (264 psi), without any significant loss in overall properties. Only impact strength shows a lowering in the blends.

In order to determine if the melt blending of the polyamide with the PET has any deleterious effect on PET molecular weight, viscosities of samples of blends C (30 percent polyamide) and F (50 percent polyamide) are compared with the viscosities of their corresponding physical mixtures, that have not been exposed to a heating and shearing environment. Because there is no readily available common solvent for both PET and the polyamide, the procedure involves determining the inherent viscosities of all the samples in trifluoroacetic acid which is an excellent solvent for PET but not for the polyamide. Accordingly, the viscosities for all the samples except Preparation 1 are the measurements of the soluble PET fraction. The results are set forth in Table V.

TABLE V

| | PET | Prep 1 | Phys. Mixture | Blend[1] |
|---|---|---|---|---|
| Virgin resin | 0.72 | — | — | — |
| After injection molding | 0.67 | 0.125[2] | — | — |
| Blend C (30/70) | — | — | 0.53 | 0.53 |
| Blend E (50/50) | — | — | 0.37 | 0.35 |

Footnotes:
[1]Compounded first in Brabender and then injection molded as described above.
[2]This is a measure of the poor solubility of the C$_9$ polyamide in trifluoroacetic acid because when it is determined in N—methylpyrrolidone (4% LiCl) the viscosity is 0.81.

The viscosity data shows clearly that the blends which went through the heating and shearing environment are virtually identical in inherent viscosity to their physical mixture counterparts which experienced no similar conditions. Therefore, it is reasonable to conclude that the blending of the polyamide with the PET does not cause any degradation of PET molecular weight.

EXAMPLE 2

A homogeneous polymer blend F in accordance with the present invention is prepared identically to the procedure employed in Example 1 including the same Brabender compounding and injection molding conditions. The components are 240 g of the poly(4,4'-methylenediphenyl dodecanediamide) in accordance with Preparation 2 above along with 560 g of the PET (Cleartuf™ 1006) and 8 g of the MP 10-52 Talc, i.e. 30 percent polyamide. The melting behaviour and recrystallization temperature of the blend is determined by the DSC method described in Example 1 and the physical properties are measured on the as-molded test pieces obtained from the injection molding process. The observed data is set forth in Table VI below.

The $T_m1$ and $T_m2$ values have the same significance as set forth in Table I of Example 1 and represent the melting points of the PET and polyamide portions respectively. The recrystallization temperature of the PET from the melt is observed at 200° C. so that the $\Delta T$ of 60° C. ($T_m1-T_{recryst}$) is 11° smaller than the $\Delta T$ for the PET alone ($\Delta T$, PET=71° C., see Table II in Example 1) which is a considerable increase in the crystallization rate for the blend F over PET. The physical properties for F set forth in Table VI show the favorable comparison to the base PET properties (set forth in Table IV above) along with the much improved HDT properties. Only the impact strength of the PET is adversely affected.

TABLE VI

| | F |
|---|---|
| $T_m1$ (°C.) | 260 |
| $T_m2$ (°C.) | 279 |
| $T_{recryst}$ (°C.) | 200 |
| $\Delta T$ (°C.) | 60 |
| Tensile str. (psi) | |
| Break | 8440 |
| Elongation | |
| Break | 3.5 |
| Tensile Modulus (kpsi) | 225.1 |
| Flex Modulus (kpsi) | 399.1 |
| Flex str. (psi) | 12,620 |
| Notched Izod (ft-lb/in-notch) | 0.32 |
| HDT (°C.) | |
| 66 psi | 126 |
| 264 psi | 89 |

EXAMPLE 3

Two homogeneous polymer blends G and H of the invention each containing 30 percent by weight of ⅛" chopped strand fiber glass (Owens Corning 497DB) are prepared similarly to the procedures set forth in Example 1 but with the following exceptions.

In G, a mixture of 360 g of the glass fiber, 252 g of the poly(4,4'-methylenediphenyl azelamide), 588 g PET (Cleartuf™ 1006) are extruded but under the Brabender conditions as follows: zone 1 and 2=272° C.; zones 3 and 4=278° C.; melt temperature 302° C.; screw speed 40 r.p.m. and torque at 1400 m-g. Test bars are injection molded from the pelletized blend using the Arburg with the following conditions: zone 1=275° C.; zones 2 and 3 at 280° C.; screw speed 75 r.p.m.; injection pressure of 650 psi; mold temperature of 140° C. with injection time of 10 seconds and 30 seconds demold. The resulting blend is 30 percent by weight polyamide based on PET and polyamide weights.

Blend H at 50 percent polyamide is identically prepared using 210 g of the ⅛" chopped strand fiber glass, 245 g of the C9 polyamide, and 245 g of PET (Cleartuf ™ 1006) under the same compounding and extrusion conditions set forth for blend G.

The blends are subjected to physical testing along with a commercially available polyethylene terephthalate containing 30 percent by weight of glass reinforcement (Rynite 530 supplied by Du Pont Co.). The results are set forth in Table VII.

The data does show the better tensile and flex properties of the Rynite sample over blends G and H. However, the HDT properties (i.e. high temperature properties) of the blends G and H are superior to that of the Rynite. For a reinforced resin such as those containing 30 percent glass reinforcement, the advantage of higher HDT under higher load conditions can result in better creep resistance at elevated temperatures. This is clearly supported in the superior creep values for blend G at 100° C. and 125° C., respectively, when compared with the Rynite sample tested only at 100° C. The sample is tested under a constant load of 3000 psi at the test temperatures. The strain (in inches) is measured with time and the values set forth in Table VII are those strain displacements after a 70 hour test period at the stated temperatures. The differences between the 0.15 and 0.20 inch for blend G and the 0.22 inch for Rynite are significant in terms of high temperature flex creep measurements.

TABLE VII

| | Compositions | | |
| --- | --- | --- | --- |
| | Rynite 530 | G | H |
| Tensile str. (psi) | | | |
| Break | 23,000 | 14,210 | 11,290 |
| Elongation (%) | | | |
| Break | 2.7 | 2.4 | 1.9 |
| Tensile Modulus (kpsi) | — | 404.0 | 655.4 |
| Flex Modulus (kpsi) | 1,300.0 | 1,266.0 | 1,142.0 |
| Flex str. (psi) | 32,000 | 16,590 | 19,930 |
| Notched Impact (ft. lb./in.-notch) | 1.60 | 1.03 | 1.30 |
| HDT | | | |
| 66 psi | 245 | 255 | 250 |
| 264 psi | 220 | 233 | 225 |
| Flexural Creep[1] Strain (inches) at | | | |
| 100° C. | 0.22 | 0.15 | — |
| 125° C. | — | 0.20 | — |

Footnotes:
[1]Flexural creep measures the strain (in inches) at high temperature under 3000 psi constant load with time; the strain values shown are those sample movement in inches after 70 hours of test; test conducted in accordance with ASTM Test Method D2990.

EXAMPLE 4

Two homogeneous blends I and J of the invention are prepared similarly to the procedures set forth in Example 1 but with the following exceptions.

For blends I and J, 150 g and 300 g of the poly(4,4'-methylenediphenyl azelamide) of Preparation 1 are mixed with respectively 850 g and 700 g of poly(cyclohexylenedimethylene terephthalate) supplied by Eastman Chemical under the trade name PCT 3879).

Both blends are compounded in the Brabender Plasti-Corder using the following extrusion conditions: screw speed of 30 rpm, torque of 750 to 900 m-g, zone temperatures of 1=295° C.; 2=290° C.; 3=295° C.; 4=295° C.; melt temperature is 320° C. The rods of homogeneous polymer blends are chopped into pellets to provide the blends I and J containing 15 percent and 30 percent by weight respectively of the polyamide component.

The DSC melting and recrystallization behaviour as well as $T_{\frac{1}{2}}$ for crysytallization for the samples are measured according to the procedures describe in Example 1 except as follows: all test samples heated up to 325° C. with a slower heat-up rate of 10° C./minute for the melting experiment, faster cool-down of 20° C./minute in the recrystallization experiment, and the quick cooling (80° C./minute) to the isothermal test temperatures of 225°, 260°, and 265° C.

The melting and recrystallization data set forth in Table VIII shows clearly the substantial decrease in ΔT for blends I and J over the poly(cyclohexylenedimethylene terephthalate) alone. The $T_{\frac{1}{2}}$ data set forth in Table IX shows the generally faster times for I and J particularly at 260° C.

TABLE VIII

| Sample | % Polyamide | $T_{cry}$ (°C.) | $T_m$ (°C.) | $T_{recryst}$ (°C.) | ΔT (°C.) |
| --- | --- | --- | --- | --- | --- |
| PCT | 0 | 131 | 297 | 227 | 70 |
| Blend I | 15 | 125 | 295 | 247 | 48 |
| Blend J | 30 | 121 | 295 | 247 | 48 |

TABLE IX

| Isothermal Test Temp. (°C.) | $T_{\frac{1}{2}}$ of crystallization (secs.) Composition | | |
| --- | --- | --- | --- |
| | PCT | Blend I | Blend J |
| 255 | 89 | 87 | 76 |
| 260 | 130 | 118 | 116 |
| 265 | 310 | 308 | 308 |

We claim:

1. A fluxed homogeneous polymer blend comprising (a) a poly(alkylene terephthalate) and (b) a sufficient amount of a crystalline polyamide to impart enhanced crystallization velocity to said polyalkylene terephthalate said (b) being a linear polyamide selected from the group consisting of poly(4,4'-methylenediphenylene azelamide), poly(4,4'-methylenediphenylene sebacamide), poly(4,4'-methylenediphenylene undecanediamide), poly(4,4'-methylenediphenylene dodecanediamide), and mixtures thereof and being further characterized in that it has been prepared by the reaction of monomers consisting essentially of 4,4'-methylenebis(-phenyl isocyanate) and the corresponding dicarboxylic acid.

2. A blend according to claim 1 wherein said polyalkylene terephthalate is polyethylene terephthalate.

3. A blend according to claim 1 wherein said polyalkylene terephthalate is polycyclohexylenedimethylene terephthalate.

4. A blend according to claim 1 wherein the proportions of said crystalline polyamide falls in a range of from about 5 to about 50 percent by weight based on combined weight of (a) and (b).

5. A blend according to claim 1 additionally comprising from about 5 to about 60 percent by weight based on total blend weight of a reinforcing material.

6. A blend according to claim 1 additionally comprising from about 5 to about 60 percent by weight based on total blend weight of fiber glass reinforcement.

7. A fluxed homogeneous polymer blend comprising
(a) from about 50 to about 85 percent by weight of a poly(alkylene terephthalate) selected from the group consisting of polyethylene terephthalate and polycyclohexylenedimethylene terephthalate; and
(b) from about 15 to about 50 percent by weight of a crystalline polyamide selected from the group consisting of poly(4,4'-methylenediphenylene azelamide), poly(4,4'-methylenediphenylene sebacamide), poly(4,4'-methylenediphenylene undecanediamide), poly(4,4'-methylenediphenylene dodecanediamide) and mixtures thereof and said polyamide being further characterized in that it has been prepared by the reaction of monomers consisting essentially of 4,4'-methylenebis(phenyl isocyanate) and the corresponding dicarboxylic acid.

8. A blend according to claim 7 additionally comprising from about 5 to about 60 percent by weight based on total blend weight of fiber glass reinforcement.

9. A blend according to claim 7 wherein said polyamide is poly(4,4'-methylenediphenylene dodecanediamide).

10. A blend according to claim 7 wherein said polyamide is poly(4,4'-methylenediphenylene azelamide).

11. A blend according to claim 10 additionally comprising about 30 percent by weight of fiber glass reinforcement.

* * * * *